United States Patent

Nishimura et al.

[11] Patent Number: 6,164,251
[45] Date of Patent: Dec. 26, 2000

[54] V-SHAPED PLURAL CYLINDER TWO-CYCLE ENGINE

[75] Inventors: Seiichi Nishimura, Hamamatsu; Tatsuyuki Masuda, Iwata, both of Japan

[73] Assignee: Sanshin Kogyo Kabushiki Kaisha, Hamamatsu, Japan

[21] Appl. No.: 08/384,916

[22] Filed: Feb. 7, 1995

[30] Foreign Application Priority Data

Feb. 7, 1994 [JP] Japan .................................... 6-013403

[51] Int. Cl.⁷ .................................................. F02B 25/08
[52] U.S. Cl. ........................................ 123/54.4; 123/65 P
[58] Field of Search ............................... 123/65 PE, 65 P, 123/65 V, 48 R, 54.4, 54.6, 54.7, 54.8, 73 AC, 73 V, 73 PP

[56] References Cited

U.S. PATENT DOCUMENTS

| | | | |
|---|---|---|---|
| 4,121,552 | 10/1978 | Mithvo et al. | 123/65 PE |
| 4,766,854 | 8/1988 | Riese . | |
| 4,829,945 | 5/1989 | Yamamoto et al. | 123/65 PE |
| 4,924,819 | 5/1990 | Boyesen | 123/65 PE |
| 4,995,354 | 2/1991 | Morikawa | 123/65 V |
| 4,998,512 | 3/1991 | Masuda et al. | 123/65 PE |
| 5,063,887 | 11/1991 | Ozawa et al. | 123/65 PE |
| 5,063,888 | 11/1991 | Ozawa et al. | 123/65 PE |
| 5,143,028 | 9/1992 | Takahashi | 123/54.6 |
| 5,183,013 | 2/1993 | Ito et al. | 123/65 PE |
| 5,207,190 | 5/1993 | Torigai et al. | 123/54.6 |
| 5,220,890 | 6/1993 | Koriyama | 123/65 PE |
| 5,341,775 | 8/1994 | Yamauchi | 123/65 PE |
| 5,361,731 | 11/1994 | Tanaka | 123/65 R |

FOREIGN PATENT DOCUMENTS

| | | |
|---|---|---|
| 0469596 | 2/1992 | European Pat. Off. . |
| 0482662 | 4/1992 | European Pat. Off. . |
| 4030768 | 4/1991 | Germany . |
| 654312 | 6/1951 | United Kingdom . |

OTHER PUBLICATIONS

European Search Report dated Jun. 15, 1995. Patent Abstracts of Japan—vol. 10 No. 211 (M–501) [2267], Jul. 24, 1987 & JP-A-61 052458 (Yamaha) Mar. 15, 1986.

*Primary Examiner*—Marguerite McMahon
*Attorney, Agent, or Firm*—Knobbe, Martens, Olson & Bear LLP

[57] ABSTRACT

Several embodiments of the type two-cycle crankcase compression engines having exhaust control valves for controlling the effective compression ratio of the engine. The exhaust control valves are rotatably journaled in respective cylinder banks and are disposed at the same distance from a plane passing through the center of the valley between the cylinder banks as each other facilitating a common drive therefor. In one embodiment the exhaust control valves are disposed on the side of the cylinder banks adjacent the valley and in another embodiment they are disposed on the outside of the cylinder banks.

10 Claims, 4 Drawing Sheets

V-SHAPED PLURAL CYLINDER TWO-CYCLE ENGINE

BACKGROUND OF THE INVENTION

This invention relates to a V-shaped plural cylinder two-cycle engines and more particularly to an improved control valve arrangement for such engines.

It has been proposed to employ an exhaust control valve in the exhaust port arrangement of a two-cycle internal combustion engine. By appropriate positioning of the control valve, the timing of opening and closing of the exhaust port can be changed during engine running. This affords the opportunity to vary the compression ratio of the engine. This permits the use of high effective compression ratios at low and mid-range in order to improve performance under these running conditions. However, the compression ratio can be lowered under high speed, high load conditions to avoid over heating.

For the most part, the application of these exhaust control valves has been limited to in-line types of engines. The reason for this is the difficulty in providing a simple mechanism which will ensure that the exhaust control valves for both cylinder banks can be operated from a single servo motor and in synchronism with each other.

It is, therefore, a principal object of this invention to provide an improved V-type multiple cylinder two-cycle engine.

It is a further object of this invention to provide an improved exhaust control valve for V-type multiple cylinder engines.

It is a still further object of this invention to provide an improved symmetrically positioned exhaust control system for each bank of a V-type engine wherein the exhaust control valves are operated by a single servo motor and in unison.

SUMMARY OF THE INVENTION

This invention is adapted to be embodied in a V-type, two cycle, crankcase compression, internal combustion engine that is comprised of a pair of cylinder banks disposed at an angle to each other and defining a valley therebetween. Cylinder bores are formed in each of the cylinder banks and have their respective axes lying at equal and opposite angles on opposite sides of a plane of symmetry passing through the valley. Exhaust ports are formed in the cylinder banks and serve the respective cylinder bores formed therein. The exhaust ports of the cylinder banks lie at equal distances on opposite sides of the plane of symmetry. Each of first and second exhaust control valves is rotatably journaled in a respective the cylinder banks and cooperate with the exhaust ports for varying the timing of the opening and closing of the exhaust ports. The first and second control valves are disposed at substantially equal distances from the plane of symmetry.

DETAILED DESCRIPTION OF THE PREFERRED EMBODIMENTS OF THE INVENTION

Figure 1:
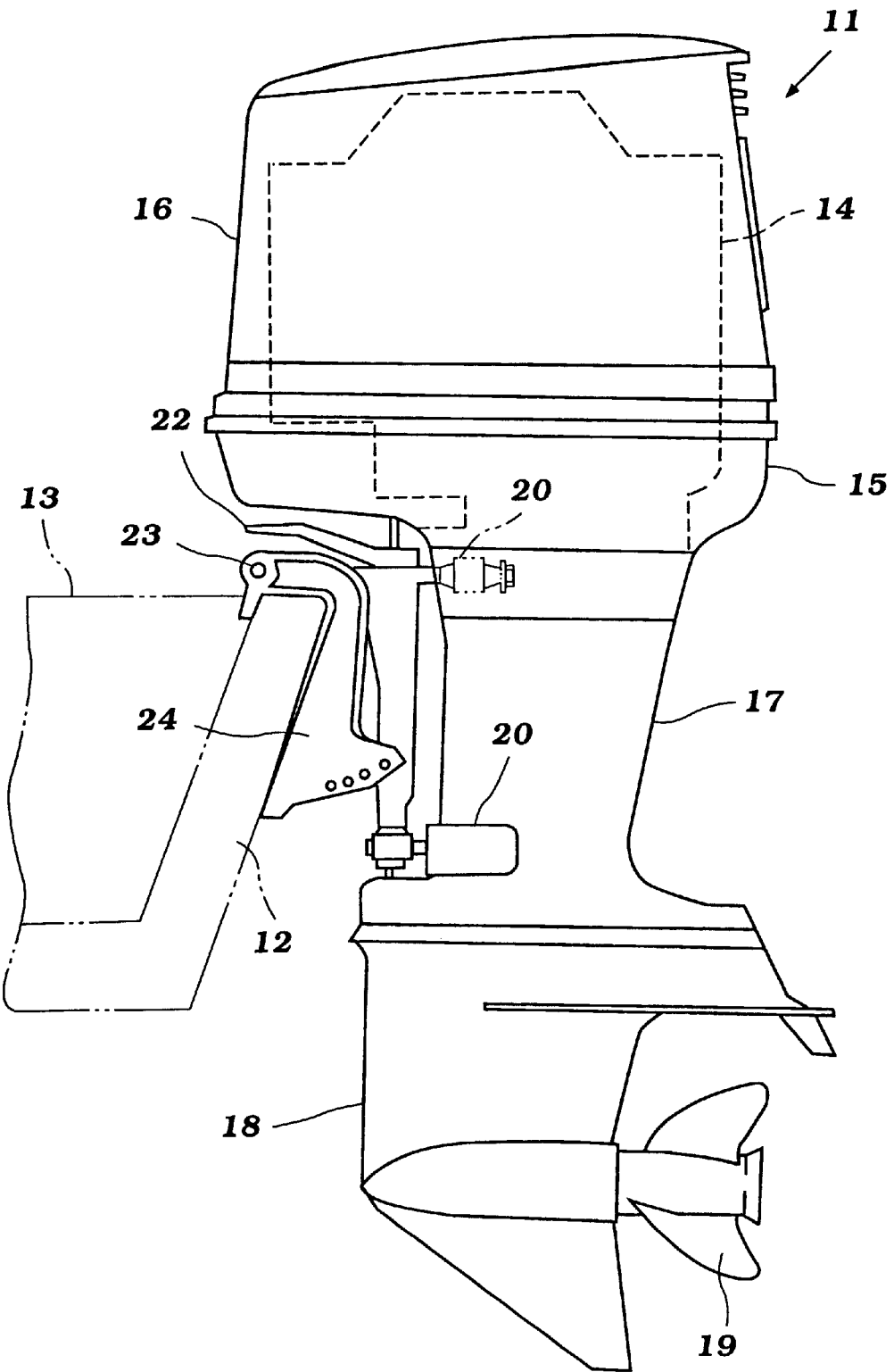
FIG. 1 is a side elevational view of an outboard motor constructed in accordance with an embodiment of the invention.

Referring first in detail to FIG. 1, an outboard motor is shown and is identified generally by the reference numeral 11. The outboard motor is shown as attached to a transom 12 of a watercraft 13 shown partially and in phantom. The invention is described in conjunction with an outboard motor such as the outboard motor 11 for exemplary purposes only. It will be understood by those skilled in the art that the invention may be practiced in a number of types of other applications for two-cycle internal combustion engines. Since these engines frequently form the power unit for an outboard motor, the illustrated embodiment is a typical environment in which the invention may be practiced and it has certain utility in conjunction with outboard motors because of their necessity for simplicity and compact construction.

The outboard motor 11 is comprised of a power head that includes a powering internal combustion engine 14 which is surrounded by a protective cowling that is comprised of a lower tray 15 and an upper main cowling portion 16 that is detachably connected to the tray 15 in a known manner. As will become apparent by reference to the remaining figures, the engine 14 is supported so that its output shaft rotates about a vertically extending axis, as is typical with outboard motor practice.

This engine output shaft is coupled to a drive shaft (not shown) that depends from and is rotatably journaled within a drive shaft housing 17. This drive shaft continues on into a lower unit 18 formed at the lower end of the drive shaft housing 17 and drives a propeller 19 selectively in forward or reverse directions through a conventional transmission of the type normally used in outboard motors. This transmission is not illustrated in the drawings A steering shaft (not shown) is affixed to the drive shaft housing 16 by means of upper and lower brackets 20. This steering shaft is journaled for steering movement of the outboard motor 11 about a vertically extending steering axis defined by a swivel bracket 21. A tiller 22 is affixed to the upper end of this steering shaft for steering of the outboard motor 11 in a manner well known in the art.

The swivel bracket 21 is, in turn, pivotally connected by means of a pivot pin 23 to a clamping bracket 24. The clamping bracket 24 is, in turn, affixed to the watercraft transom 12 in a well known manner. The pivot pin 23 permits tilt and trim movement of the outboard motor 11 as is well known in this art.

Figure 2:
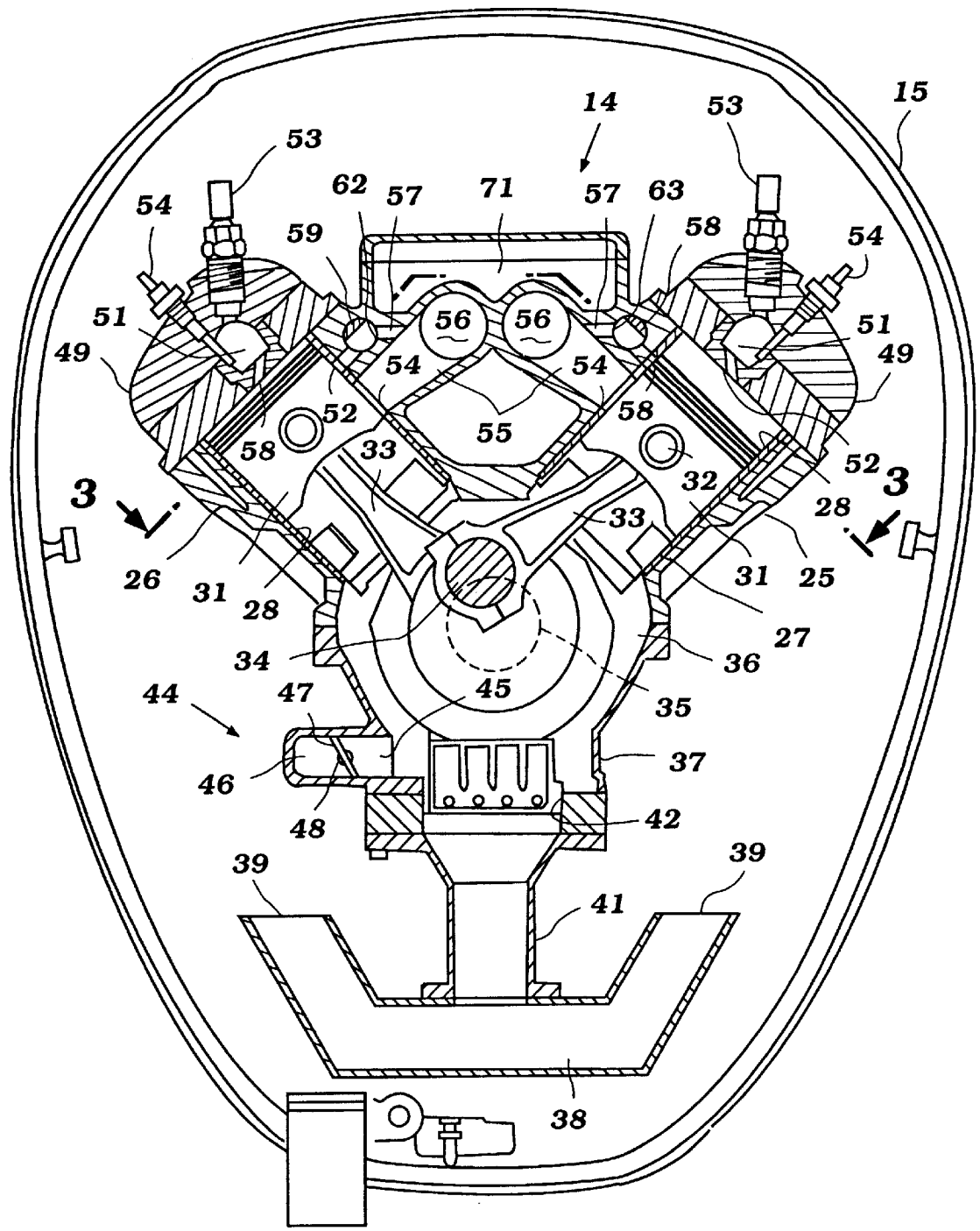
FIG. 2 is an enlarged top plan view of the outboard motor with a portion of the protective cowling removed and with the engine shown in cross section.

The construction of the outboard motor 11 as thus far described may be considered to be conventional and, as has been noted, has been made primarily for illustration of a typical environment in which the invention may be employed. The invention deals primarily with the engine 14 and its construction will now be described by reference to FIGS. 2 and 3.

The engine 14 is, in the illustrated embodiment, of the V-6 type and thus includes a cylinder block, indicated generally by the reference numeral 25, and which is comprised of a pair of angularly disposed cylinder banks 26 and 27. Three cylinder bores 28 are formed in each of the cylinder banks 26 and 27 by means of pressed or cast-in liners 29. As is typical with V-type engine practice, the cylinder banks 26 and 27 are staggered relative to each other for a reason which will be described. It is to be understood that, although the invention is described in conjunction with a V-6 type of engine, those skilled in the art will readily understand how the invention can be practiced with V-type engines having other numbers of cylinders.

Pistons 31 reciprocate in each of the cylinder bores 28. The pistons 31 are connected by means of piston pins 32 to the upper or small ends of connecting rods 33. The lower or big ends of the connecting rods 33 are journaled on respective throws 34 of a crankshaft 35. The staggering of the cylinder banks 26 and 27 in an axial direction is done so that the connecting rods 33 of the pistons 31 from the respective cylinder banks can be journaled in side-by-side relationship on common throws 34 of the crankshaft 35. This practice is well known in the art.

The crankshaft 35 is rotatably journaled within a crankcase chamber 36 formed by the skirt of the cylinder block 35 and a crankcase member 37 that is affixed to the cylinder block 25 in a well known manner. As is typical with two-cycle crankcase compression engines, the crankcase chambers 36 associated with each of the cylinder bores 28 is sealed from the others.

An intake charge is delivered to these crankcase chambers 36 through an induction system that includes an air inlet device 38. As has been noted, the crankshaft 35 is supported so that it rotates about a vertically extending axis. In this embodiment, the induction system and specifically the intake device 38 is disposed at the rear of the outboard motor and defines a pair of forwardly facing air inlet openings 39. Air is drawn into these inlet openings 39 from within the protective cowling for engine combustion. As is well known, the cowling and primarily the main cowling member 16 is provided with an atmospheric air inlet opening so that air can be drawn into the protective cowling for engine combustion and cooling.

The air inlet device 38 supplies an intake manifold 41 that is connected to and supplies air to the crankcase chambers 36 through intake ports 42 formed in the crankcase chamber 36. Reed type check valves 43 are provided in the intake ports 42 so as to permit air to be drawn into the chambers 36 when the respective piston 31 moves upwardly and to preclude reverse flow as the pistons 31 move downwardly for compressing the charge.

The compressed charge is then transferred to the area in the cylinder bores 28 above the pistons 31 through suitable scavenge passages (not shown).

In order to control the amount of scavenging airflow from the crankcase chambers 36 to the combustion chambers, which will be described, there is provided a scavenge control system, indicated generally by the reference numeral 44. This scavenge control system 44 includes a plurality of control passages 45, each extending from the same side of a respective crankcase chamber 36 to a scavenge control manifold 46 which is common for all crankcase chambers and is disposed on one side of the crankcase member 37. Scavenge control throttle valves 47 are supported on a common scavenge control valve shaft 48 that is operated in response to engine running conditions so as to provide the desired amount of scavenging.

Referring now to the combustion chambers for the engine, these are formed by the heads of the pistons 31, the cylinder bores 28, and by means of a cylinder head assemblies 49 that are affixed to the respective cylinder bank 26 or 27 in any suitable manner. The lower surface of the cylinder head 49 may be configured to provide the desired shape for the main portion of the combustion chamber. In addition, a precombustion chamber 51 is formed in each cylinder head 49 for each cylinder bore 28. This pre-chamber 51 communicates with the main combustion chamber through a throat 52.

The engine 14 operates on a diesel cycle and to this end, a fuel injector 53 is mounted in each cylinder head 49, one for each combustion chamber or pre-chamber 51 formed therein. As is well known with diesel practice, when the charge which has been compressed in the crankcase chamber 36 is transferred to the area above the pistons 31, it will be further compressed by the upward movement of the pistons 31 and raise the pressure and temperature both in the main combustion chamber and in the pre-combustion chamber 51. When the fuel injectors 53 inject fuel into this highly compressed air charge, the fuel will ignite and expand. A torch of flame will pass through the throats 52 into the main combustion chambers where the combustion continues and the gasses expand to drive the pistons 31 downwardly.

If desired, glow plugs 54 may be mounted in the cylinder head assemblies 49 and extend into each pre-chamber 51 for assisting in the initiation of combustion, particularly under low temperature and start-up conditions.

As the pistons 31 are driven downwardly, eventually they will open respective exhaust ports 54 formed in the cylinder liners 29 and cylinder block 25. In this embodiment, the exhaust ports 54 are disposed in the valley formed between the cylinder banks 26 and 27 and are spaced at an equal distances from a plane passing through the valley and bisecting the angle between the axes of the cylinder bores 28. These exhaust ports 54 extend into exhaust passages 55 formed in the respective cylinder banks 26 and 27 and terminate at collector sections 56 of an exhaust manifold which is formed integrally within the cylinder block 25. The exhaust manifolds deliver the exhaust gasses downwardly into the driveshaft housing 17 and lower unit 18 for discharge through a conventional type of outward motor exhaust system.

In accordance with the invention, the effective compression ratio of the engine 14 is varied by means that include an auxiliary exhaust passage 57 which is formed in each cylinder bank 26 and 27 for each of its cylinder bores 28. Each auxiliary exhaust passage terminates in an auxiliary exhaust port 58 that is formed in the cylinder liner 29 and cylinder block 25 above the main exhaust port 54.

The flow through the auxiliary exhaust passages 57 is controlled by means of a pair of exhaust control valves 59 and 61, each received in a respective bore 62 and 63 of the cylinder bank 26 and 27. The exhaust control valve 59 is formed with valving portions that selectively open and close the supplemental exhaust passages 57 and, therefore, act to delay or advance the timing of opening and closing of the exhaust passages.

The supplemental exhaust passages 57 merge into the main exhaust passages 55 downstream of the respective control valves 59 and 61. The cylinder block bores 62 and 63 are formed at the same distance from the bisecting plane of symmetry previously referred to and are also spaced equal distances from the center of rotation of the crankshaft 35.

Figure 3:
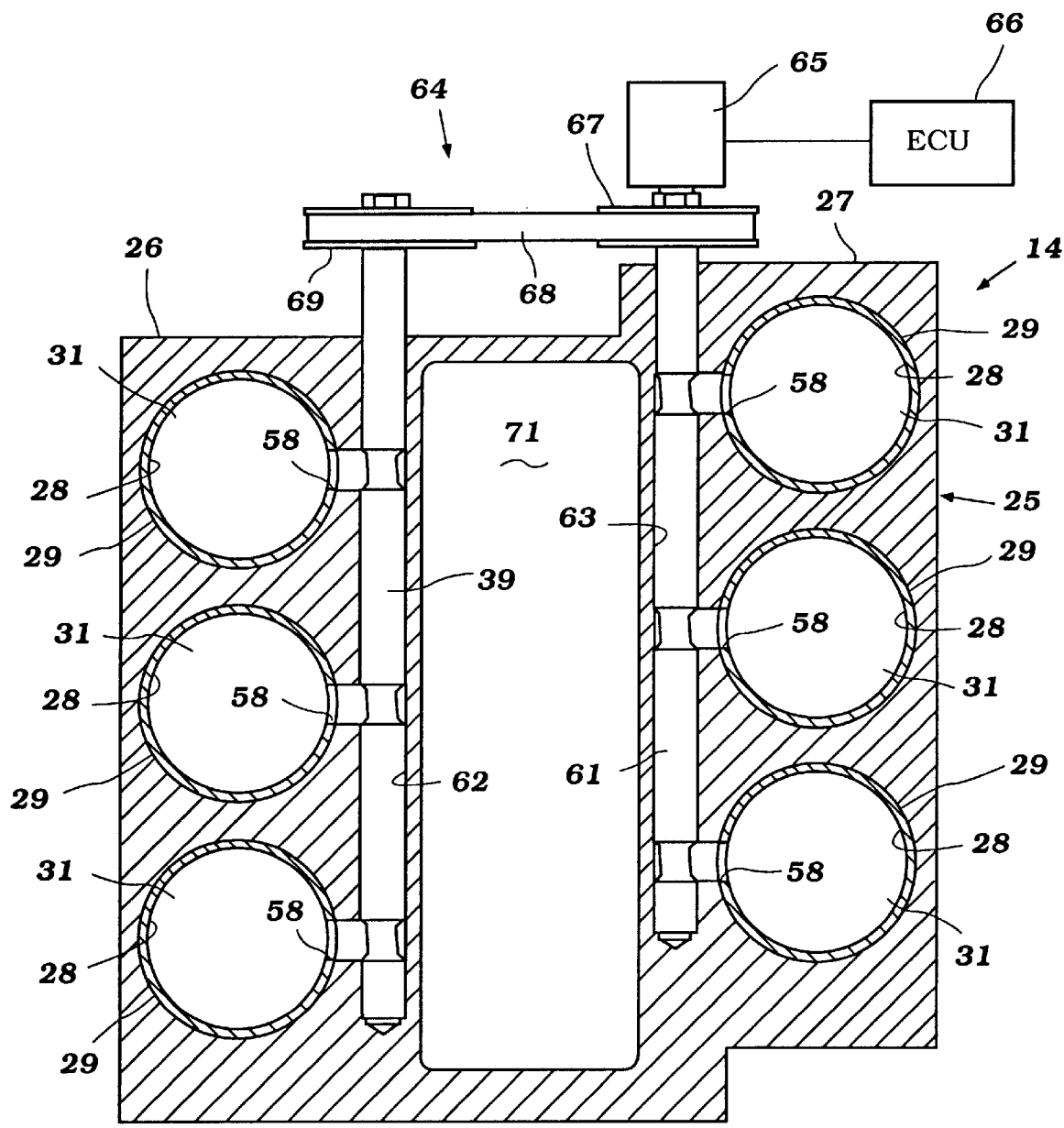
FIG. 3 is a cross-sectional view taken along the line 3—3 of FIG. 2 and shows the exhaust control valve operating mechanism in part schematically.

As a result, it is possible to operate these exhaust control valves 59 and 61 through a common timing mechanism, indicated generally by the reference numeral 64 and shown best in FIG. 3. This timing mechanism 64 includes a stepper motor 65 at the top of the engine 14 which is reversible and which is controlled by an ECU 66 that receives certain signals indicative of engine running conditions. These may be speed and/or load. The stepping motor 65 is directly coupled to the exhaust control valve 61 and also drives a pulley 67 which may be a toothed pulley and is engaged by a toothed belt 68. The belt 68, in turn, drives a pulley 69 fixed to the remaining exhaust control valve 59 for positioning it simultaneously with the positioning of the control valve 61.

The engine 14 is water cooled and includes a cooling jacket through which coolant is circulated in any known manner. This cooling jacket includes a portion 71 which encircles not only the exhaust manifold collector section 61 and exhaust passages 55, but also the control valves 59 and 61.

Figure 4:
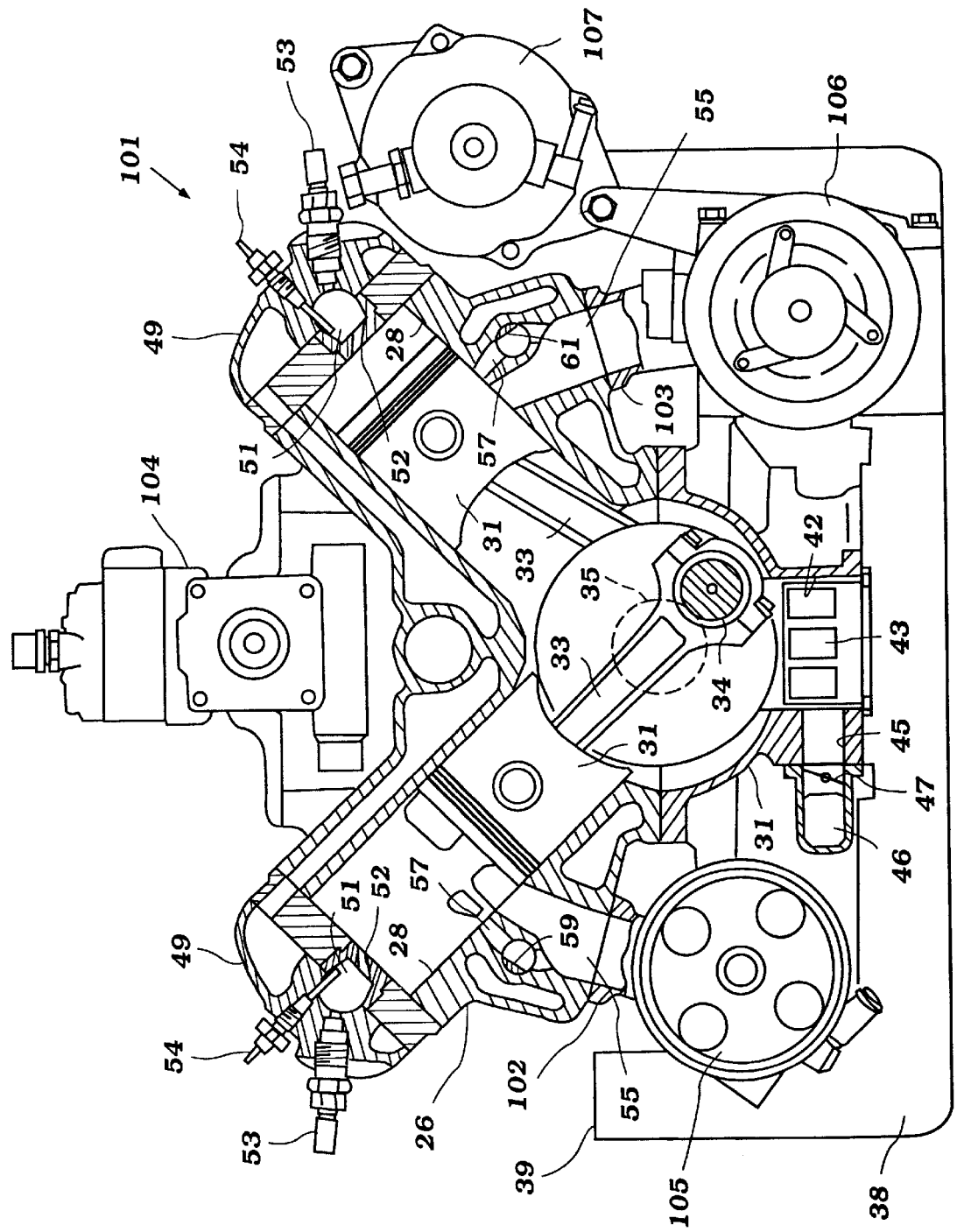
FIG. 4 is a view in part similar to FIG. 2 but with the protective cowling removed and showing another embodiment of the invention.

In the embodiment thus far described, the exhaust manifolds and supplemental exhaust passages and exhaust control valves have been positioned in the valley between the cylinder banks. FIG. 4 shows another embodiment of the invention which is generally the same as the embodiment thus far described, but wherein the exhaust ports are formed on the outside of the cylinder banks. For that reason, components of this embodiment which are the same as that previously described or substantially the same, have been identified by the same reference numerals and will not be described, except insofar as is necessary to understand the construction and operation of this embodiment.

As may be seen, the engine, indicated generally by the reference numeral 101, has the same general overall configuration. However and as is noted above, the exhaust passages 55, exhaust ports 54, supplemental exhaust passages 57, supplemental exhaust ports 59, and exhaust control valves 59 and 61, are disposed at equal distances and symmetrically on the outer sides of the cylinder banks 26 and 27. They discharge to respective exhaust manifolds 102 and 103 which again deliver the exhaust gasses downwardly to the driveshaft housing and lower unit for discharge through the typical underwater exhaust gas discharge.

This embodiment positions a high pressure fuel pump, indicated generally by the reference numeral 104 in the valley between the cylinder banks 26 and 27 so as to maintain a compact engine construction.

This figure also shows a number of accessories which are driven by the crankshaft 35 and these include a power steering pump 105, and air conditioning compressor 106, and an alternator 107. These elements are all driven by one or more belts (not shown) by the crankshaft in a well known manner.

It should be readily apparent from the foregoing description that the described construction permits the use of a V-type two-cycle engine having multiple cylinders and wherein the compression ratio can be controlled by two simultaneously operated exhaust control valves. Of course, the foregoing description is that of preferred embodiments of the invention and various changes and modifications may be made without departing from the spirit and scope of the invention, as defined by the appended claims.

We claim:

1. A V-type two-cycle crankshaft compression internal combustion engine comprised of a cylinder block having a pair of cylinder banks disposed at an angle to each other and defining a valley therebetween, cylinder bores formed in said cylinder banks and having their respective axes disposed on opposite sides of a plane of symmetry passing through said valley, exhaust ports formed in said cylinder banks and serving respective cylinder bores therein, said exhaust ports of said cylinder banks being at equal distances on opposite sides of said plane of symmetry, each of said cylinder banks being formed with a valve bore extending from one end of said engine on a respective side of said plane and parallel to each other and to said plane at equal distances therefrom, first and second exhaust control vales each rotatably journaled in a respective one of said valve bores, and a common actuator located at said one end of said engine for actuating both of said first and said second exhaust control valves simultaneously.

2. A V-type two-cycle crankshaft compression internal combustion engine as set forth in claim 1, wherein the exhaust control valves are disposed on the sides of the respective cylinder bank adjacent the valley of the engine.

3. A V-type two-cycle crankshaft compression internal combustion engine as set forth in claim 1 wherein the exhaust ports are formed on the side of the cylinder banks disposed furthest from the valley and wherein the first and second exhaust control valves are disposed on the side of the cylinder banks furthest from the valley.

4. A V-type two-cycle crankshaft compression internal combustion engine as set forth in claim 1, wherein the exhaust control valves each valve a supplemental exhaust gas passage extending from a supplemental exhaust gas port in the cylinder and terminating in a common passage with the exhaust ports.

5. A V-type two-cycle crankshaft compression internal combustion engine as set forth in claim 4, further including a crankshaft driven by pistons in the cylinder bores and rotatably journaled within a crankcase chamber, said crankcase chamber being divided into separate sealed chambers, each associated with a respective cylinder bore, and means for delivering an air charge to said crankcase chambers, said exhaust control valves rotating about axes parallel to the axis of rotation of said crankshaft.

6. A V-type two-cycle crankshaft compression internal combustion engine as set forth in claim 5, further including scavenge control means comprised of a scavenge manifold communicating with each of the crankcase chambers and scavenge control valves controlling the communication of said crankcase chambers with said scavenge manifold.

7. A V-type two-cycle crankshaft compression internal combustion engine as set forth in claim 6, wherein the scavenge control valves are all fixed to a common shaft disposed at one side of the crankcase.

8. A V-type two-cycle crankshaft compression internal combustion engine as set forth in claim 7, wherein the exhaust control valves are disposed on the sides of the respective cylinder bank adjacent the valley of the engine.

9. A V-type two-cycle crankcase compression internal combustion engine as set forth in claim 8, wherein the engine is liquid cooled, said exhaust ports serving an exhaust manifold formed in the valley between the cylinder banks and wherein the cylinder block is formed with a cooling jacket surrounding at least in part said exhaust manifold and a portion of said exhaust ports.

10. A V-type two-cycle crankcase compression internal combustion engine as set forth in claim 9, wherein the cooling jacket is juxtaposed to the exhaust control valves for cooling the exhaust control valves.

\* \* \* \* \*